US011281985B2

(12) United States Patent
Imazawa

(10) Patent No.: US 11,281,985 B2
(45) Date of Patent: Mar. 22, 2022

(54) CAUSAL INFERENCE MODEL CONSTRUCTION METHOD

(71) Applicant: HITACHI, LTD., Tokyo (JP)

(72) Inventor: Kei Imazawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 406 days.

(21) Appl. No.: 16/448,748

(22) Filed: Jun. 21, 2019

(65) Prior Publication Data

US 2020/0005176 A1 Jan. 2, 2020

(30) Foreign Application Priority Data

Jun. 27, 2018 (JP) ............................ JP2018-121859

(51) Int. Cl.
*G06N 7/00* (2006.01)
*G06F 17/18* (2006.01)

(52) U.S. Cl.
CPC ............ *G06N 7/005* (2013.01); *G06F 17/18* (2013.01)

(58) Field of Classification Search
CPC ................................ G06F 17/18; G06N 7/005
See application file for complete search history.

(56) References Cited

U.S. PATENT DOCUMENTS

| | | | | |
|---|---|---|---|---|
| 2002/0107839 | A1* | 8/2002 | Heckerman | G06F 16/2462 |
| 2008/0270088 | A1* | 10/2008 | Abe | G05B 17/02 703/2 |
| 2010/0262387 | A1* | 10/2010 | Alstad | G01F 23/168 702/55 |
| 2017/0353477 | A1* | 12/2017 | Faigon | G06F 21/6209 |
| 2018/0267489 | A1* | 9/2018 | Tango | B08B 13/00 |

FOREIGN PATENT DOCUMENTS

| | | |
|---|---|---|
| JP | 2013-008221 A | 1/2013 |

* cited by examiner

*Primary Examiner* — Yoshihisa Ishizuka
(74) *Attorney, Agent, or Firm* — Volpe Koenig

(57) ABSTRACT

A causal inference model construction method is performed using a computer. The computer includes a control unit and a storage unit, and the control unit implements: a result value reception step of reading manufacturing log data acquired in a manufacturing process and an inspection process; a correlation model construction step of constructing a correlation model using the manufacturing log data; a physical model reception step of receiving an input of a physical model; a probability distribution computation step of calculating probability distributions of the correlation model and the physical model; a probability distribution convergence processing step of performing convergence computation on the probability distribution of the correlation model, approximating a result of the convergence computation to the probability distribution of the physical model, and overwriting the correlation model; and a causal inference model holding step of storing a correlation model as a causal inference model in the storage unit.

8 Claims, 10 Drawing Sheets

[FIG. 1]
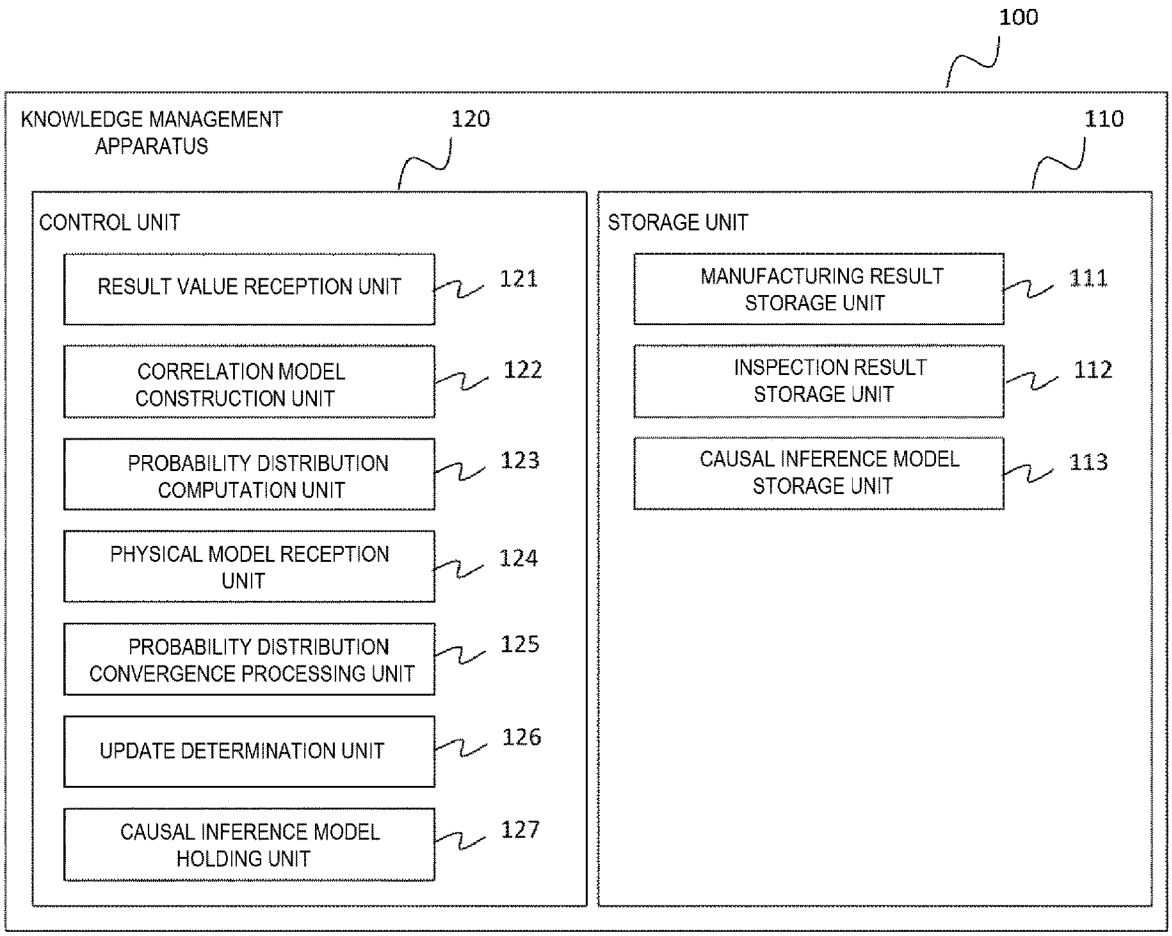

| pVar1 | pVar2 | pVar3 | pVar4 | pVar5 | pVar6 | pVar7 | pVar8 | pVar9 | pVar10 |
|---|---|---|---|---|---|---|---|---|---|
| A01 | 16.2 | 0.6 | 0.6 | 0 | 58.2 | 0.9 | 5.6 | 6.8 | 1 |
| A02 | 79.4 | 0.4 | 6.8 | 0 | 54.1 | 0.6 | 8.5 | 1.3 | 0.2 |
| A03 | 31.1 | 0.8 | 0.4 | 0.1 | 87 | 0.9 | 3.5 | 7.2 | 0.3 |
| A04 | 52.9 | 0.5 | 0.7 | 0 | 26.5 | 0.7 | 4.5 | 1.1 | 0.4 |
| A05 | 16.6 | 0.4 | 5.2 | 0.1 | 31.8 | 0.6 | 0.5 | 1.2 | 0.1 |
| A06 | 60.2 | 0.9 | 1 | 0.1 | 11.9 | 0.8 | 1.8 | 6.4 | 0.7 |
| A07 | 26.3 | 0.9 | 8.2 | 0.1 | 94 | 0.9 | 6.6 | 3.3 | 0.4 |
| A08 | 65.4 | 0.6 | 8.2 | 0 | 64.6 | 1 | 3.3 | 6.5 | 1 |
| A09 | 68.9 | 0.6 | 7.2 | 0 | 47.9 | 0 | 9 | 7.5 | 0.4 |
| A10 | 74.8 | 0.6 | 1.5 | 0 | 63.9 | 0.9 | 1.2 | 5.8 | 0.6 |
| A11 | 45.1 | 0.2 | 6.6 | 0.1 | 54.5 | 0.6 | 9.9 | 7.4 | 0.2 |
| A12 | 8.4 | 0.3 | 5.2 | 0.1 | 64.7 | 1 | 5.4 | 2.3 | 0.4 |
| B01 | 22.9 | 0.5 | 9.7 | 0 | 54.4 | 0.5 | 7.1 | 7.3 | 0.2 |
| B02 | 91.3 | 0.2 | 6.5 | 0.1 | 72.1 | 0.5 | 10 | 9.7 | 0.8 |
| B03 | 15.2 | 0.8 | 8 | 0.1 | 52.2 | 0.8 | 2.9 | 8.7 | 0.9 |
| B04 | 82.6 | 0.2 | 4.5 | 0.1 | 99.4 | 0.2 | 4.1 | 0.9 | 0.4 |
| B05 | 53.8 | 0.2 | 4.3 | 0.1 | 21.9 | 0.5 | 4.6 | 3.7 | 0.7 |

| cVar1 | cVar2 | cVar3 | cVar4 | cVar5 | cVar6 | cVar7 | cVar8 | cVar9 | cVar10 |
|---|---|---|---|---|---|---|---|---|---|
| A01 | 7.9 | 50.2 | 0.9 | 3.8 | 0.1 | 15.1 | 0.8 | 3 | OK |
| A02 | 6.8 | 92 | 0.1 | 1.4 | 0.1 | 90.8 | 0.7 | 5.9 | OK |
| A03 | 4.8 | 0.8 | 0.9 | 0.2 | 0.1 | 46 | 0.2 | 6.3 | OK |
| A04 | 1.6 | 20.3 | 0.1 | 5.3 | 0.1 | 18.1 | 0.7 | 9.5 | OK |
| A05 | 0.9 | 20.4 | 0.4 | 1.4 | 0.1 | 93.8 | 0.6 | 6.6 | OK |
| A06 | 8.5 | 68.3 | 1 | 1.9 | 0.1 | 84.1 | 0.6 | 0.6 | OK |
| A07 | 6.4 | 33.5 | 1 | 3.7 | 0.1 | 23.8 | 1 | 7.6 | OK |
| A08 | 9.2 | 62.7 | 0 | 6.9 | 0 | 83.8 | 0.1 | 6.3 | OK |
| A09 | 1.9 | 18.9 | 0.7 | 2.3 | 0 | 46 | 0.9 | 6.3 | NG |
| A10 | 7.3 | 60.9 | 1 | 6.1 | 0 | 33.6 | 0.1 | 1 | OK |
| A11 | 7.7 | 3.5 | 0.9 | 3.9 | 0.1 | 64.7 | 0.9 | 7.2 | OK |
| A12 | 3.2 | 33.3 | 0.7 | 1.6 | 0.1 | 75.7 | 0.2 | 9.2 | OK |
| B01 | 1.8 | 11.4 | 0.3 | 6.1 | 0 | 60.5 | 0.7 | 0.4 | OK |
| B02 | 1.7 | 64 | 0.4 | 7.4 | 0 | 33.3 | 0.9 | 9.1 | NG |
| B03 | 3 | 66 | 0 | 7.7 | 0 | 94.7 | 0.7 | 0.8 | NG |
| B04 | 7.5 | 65.2 | 0.4 | 1.8 | 0 | 17.8 | 0.2 | 1.1 | NG |
| B05 | 9.7 | 4.9 | 0.7 | 0.7 | 0.1 | 71.7 | 0 | 7.2 | NG |

[FIG. 4]
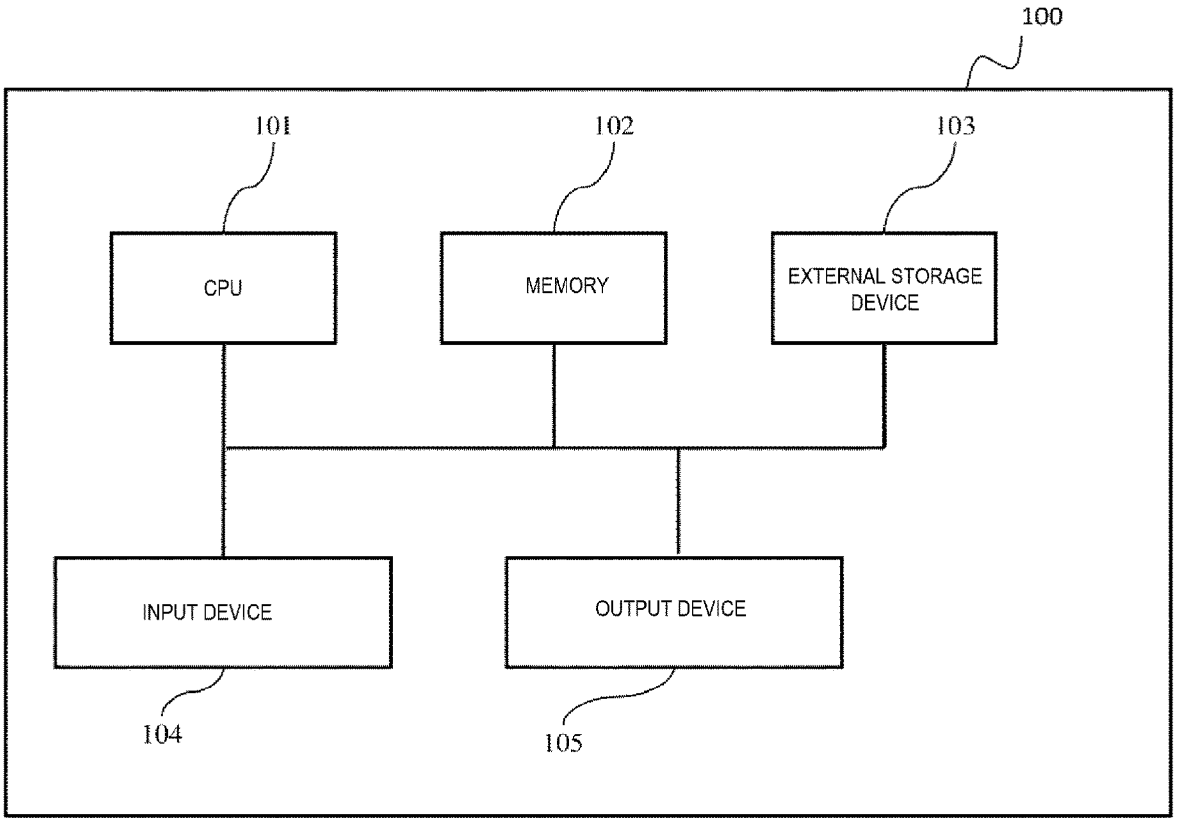
[FIG. 5]
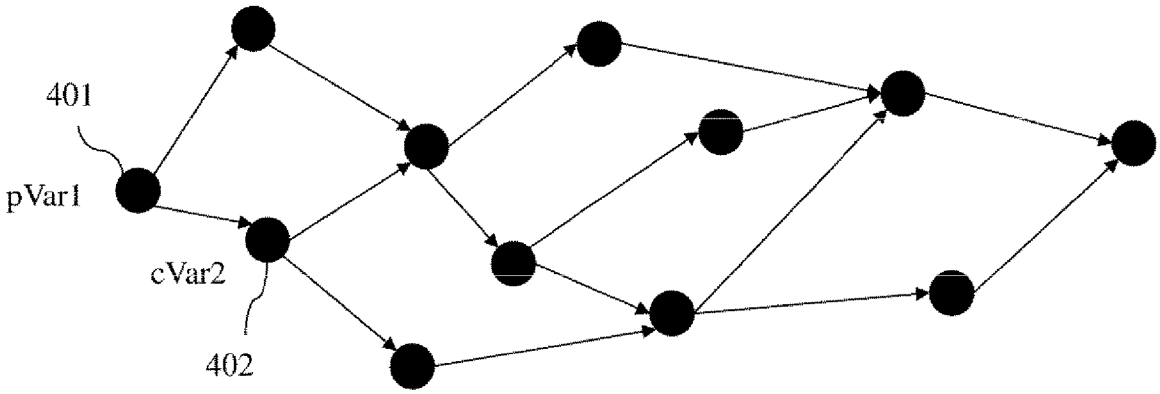

[FIG. 6]
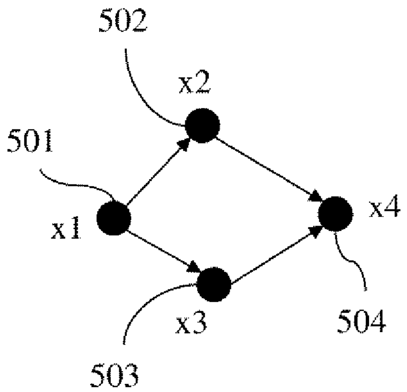
$$p(x1, x2, x3, x4) = p(x2|x1) \cdot p(x3|x1) \cdot p(x4|x2, x3)$$

[FIG. 7]
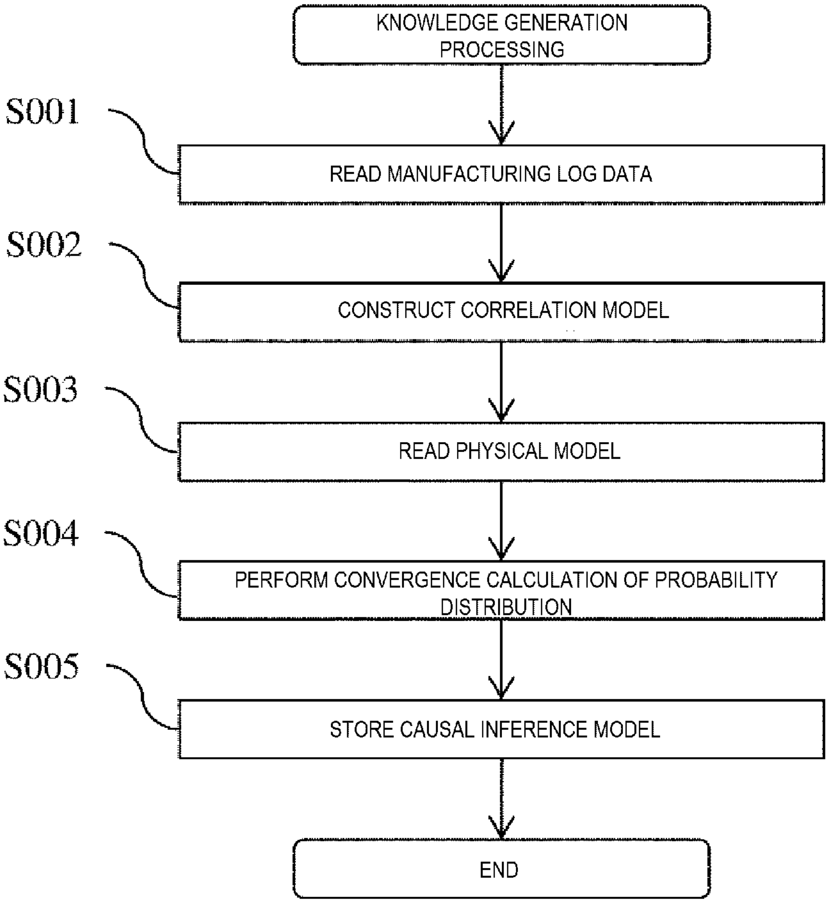

[FIG. 8]
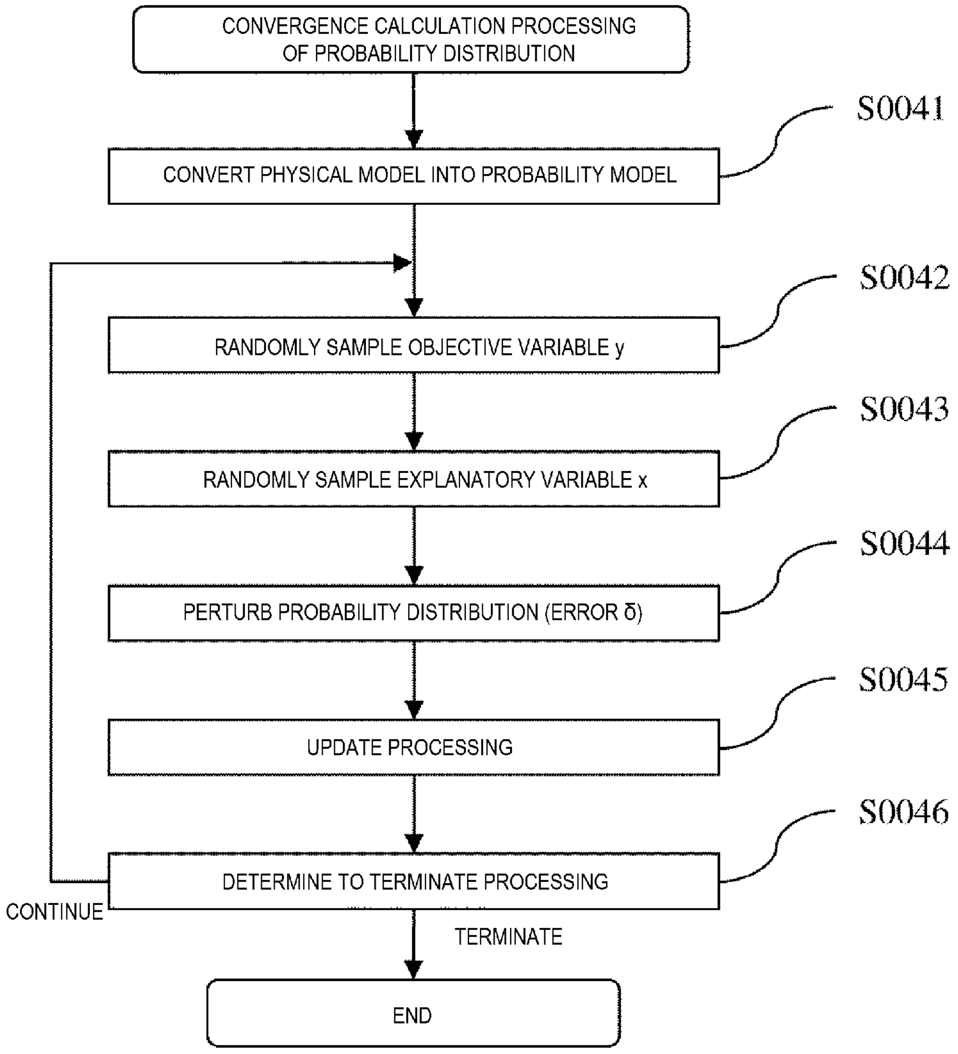

[FIG. 9]
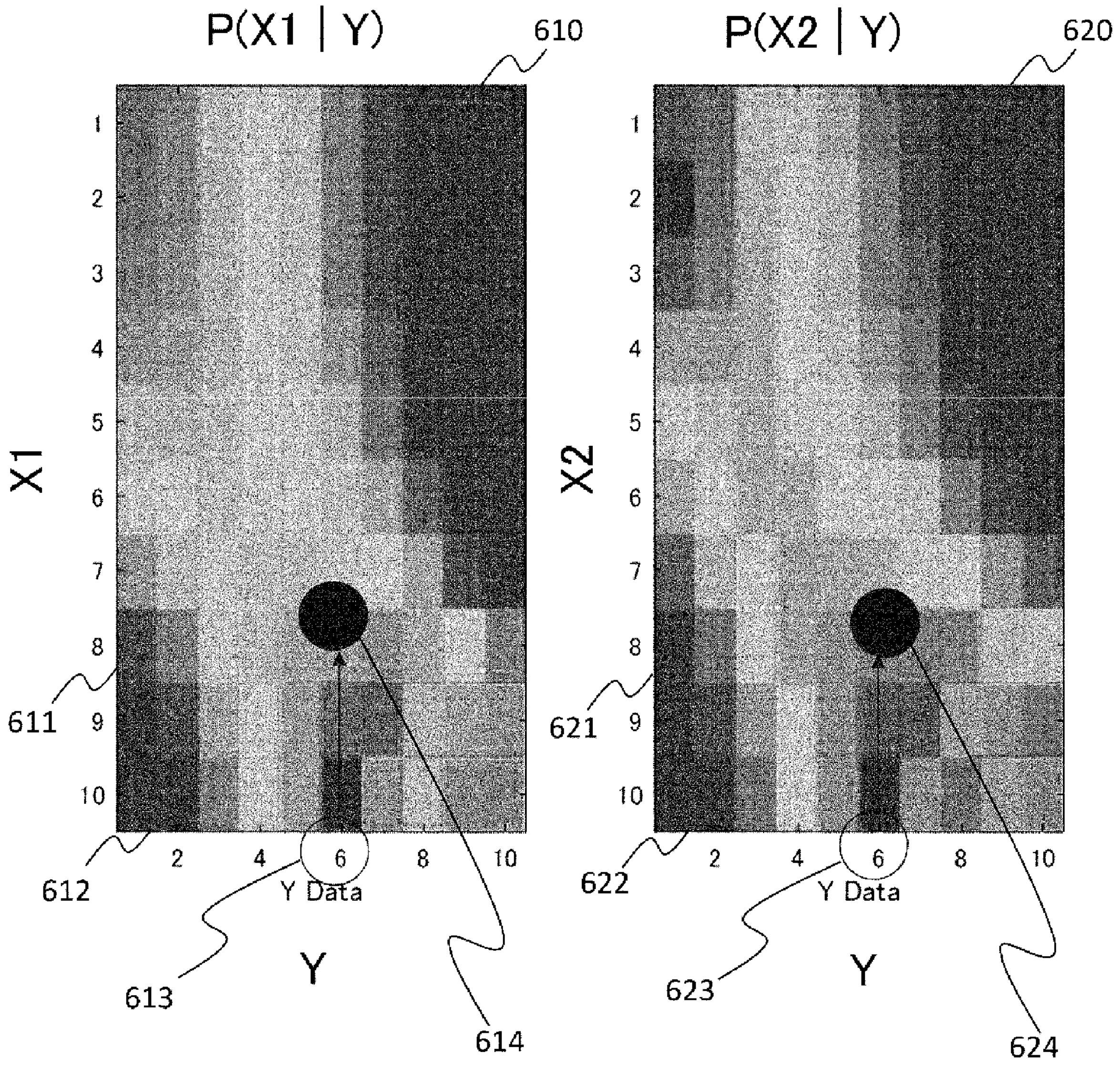

[FIG. 10]

```
{
 "Frame":[
         [-0.01,0.01],
         [0.01,0.03]
              ],
 "UniqueName":"Class",
 "Parents":[],
 "Prob":
     [0.51,0.49],
 "Qty":
     [4297,4271],
 "Label":["Yield"],
"ParentsFrame":[]
}
```

[FIG. 11]
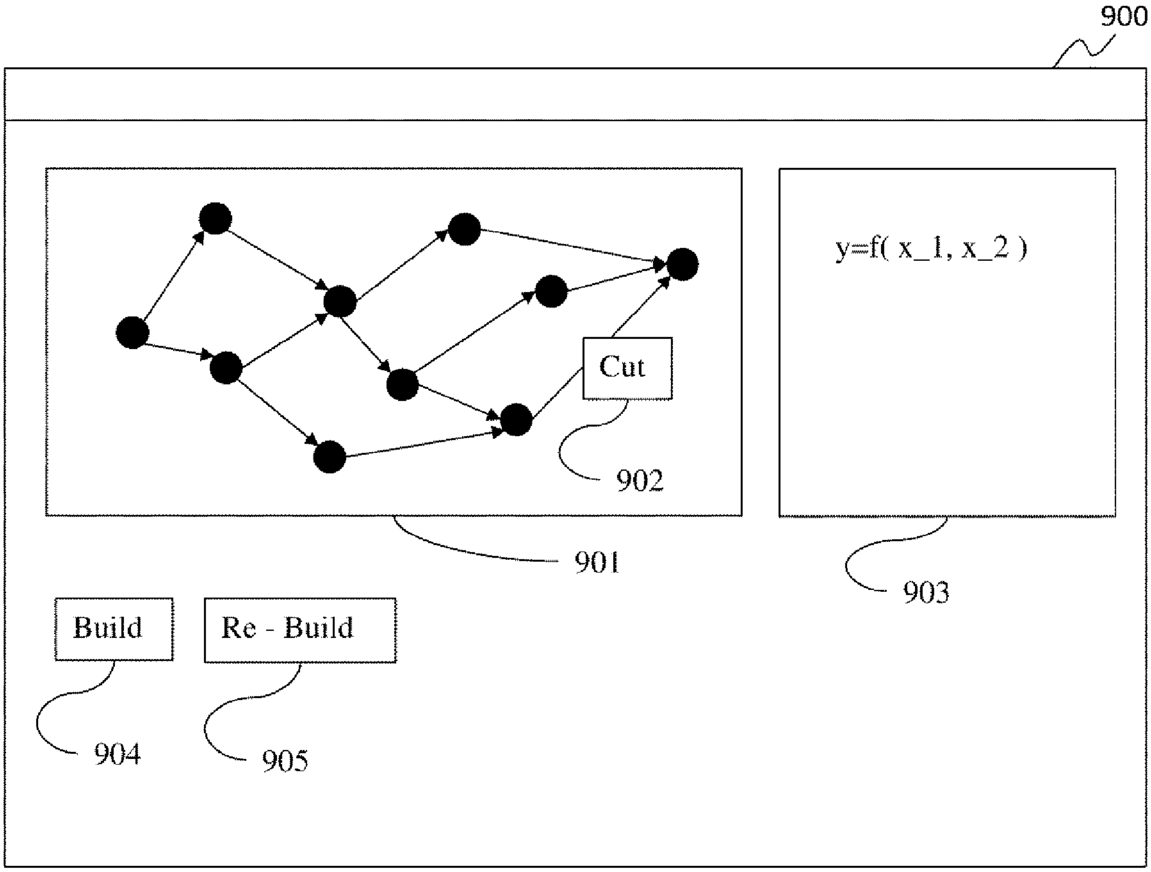

CAUSAL INFERENCE MODEL CONSTRUCTION METHOD

TECHNICAL FIELD

The present invention relates to a causal inference model construction method.

BACKGROUND ART

JP-A-2013-008221 (PTL 1) describes a background technique of this technical field. This document describes "a computing device is a data flow graph in a form of backward inference that performs inference of predicate logic in symbolic logic. The computing device includes a network creation unit that performs conversion into a data flow graph representing a structure of the predicate logic by a plurality of arithmetic nodes and a plurality of edges connecting the arithmetic nodes, and includes a computation execution unit that performs derivation to the predicate logic by propagation processing of tokens based on the converted data flow graph".

PRIOR ART LITERATURE

Patent Literature

PTL 1: JP-A-2013-008221

SUMMARY OF INVENTION

Technical Problem

The technique described in PTL 1 discloses a method of performing logical inference by symbolic logic. However, it is not possible to model a quantitative causal relation such as a known physical model at a manufacturing site only with a data flow in symbolic logic.

An object of the invention is to facilitate extraction of knowledge in a manufacturing site by modeling knowledge of a physical model and the like that has been confirmed tenable into a form that can be mutually used in other manufacturing sites.

Solution to Problem

The present application includes a plurality of methods that solve at least a part of the above problem, and an example of the plurality of methods is as follows. In order to solve the above problem, an aspect of the invention provides a causal inference model construction method using a computer. The computer includes a control unit and a storage unit, and the control unit implements the following steps of: a result value reception step of reading, from the storage unit, manufacturing log data including sensor data acquired in either or both of a manufacturing process and an inspection process; a correlation model construction step of constructing a correlation model using the manufacturing log data; a physical model reception step of receiving an input of a physical model obtained by modeling a physical law related to the manufacturing process; a probability distribution computation step of calculating probability distributions of the correlation model constructed in the correlation model construction step and the physical model; a probability distribution convergence processing step of performing convergence computation on the probability distribution of the correlation model, approximating a result of the convergence computation to the probability distribution of the physical model, and overwriting the correlation model; and a causal inference model holding step of storing a correlation model which is a processing result of the probability distribution convergence processing step in the storage unit as a causal inference model.

Advantageous Effect

According to the invention, it is possible to achieve a technique to facilitate extraction of knowledge in a manufacturing site by modeling knowledge of a physical model and the like that has been confirmed tenable into a form that can be mutually used. Problems, configurations, and effects other than the above will become apparent from description of an embodiment below.

BRIEF DESCRIPTION OF DRAWINGS

FIG. 1 shows a configuration example of a knowledge management apparatus according to a first embodiment of the invention.

FIG. 2 shows an example of a data structure of a manufacturing result storage unit.

FIG. 3 shows an example of a data structure of an inspection result storage unit.

FIG. 4 shows an example of a hardware configuration of the knowledge management apparatus.

FIG. 5 shows an example of a causal inference model.

FIG. 6 shows an example of a causal relation.

FIG. 7 shows an example of a flow of a knowledge generation processing.

FIG. 8 shows an example of a flow of a convergence computation processing of probability distribution.

FIG. 9 shows an example of a random sampling processing.

FIG. 10 shows an example of a data structure using JSON of a causal inference model.

FIG. 11 shows an example of an output screen of the knowledge generation processing.

DESCRIPTION OF EMBODIMENTS

Hereinafter, an embodiment according to the invention is described with reference to drawings. Note that the same components are generally denoted by the same reference symbols throughout the drawings for describing the embodiment, and repetitive descriptions thereof will be omitted. Further, in the embodiment described below, it is needless to say that the components (including element steps and the like) are not always indispensable unless otherwise stated or except a case where the components are apparently indispensable in principle. Further, it is needless to say that expressions "formed of A", "made of A", "having A", and "including A" do not exclude elements other than A unless otherwise stated that A is the only element thereof. Similarly, in the following embodiment, when referring to shapes, positional relationships, and the like of the components and the like, shapes and the like which are substantially approximate or similar to those are included unless otherwise stated or except a case where it is conceivable that they are apparently excluded in principle.

In statistical concepts, there are concepts that are seemingly similar but different from each other, such as correlation and causality. A "correlation" relation means a relation between two variables in which when a value of one variable is large, a value of the other variable is also large. For example, a relation between weight and height is in such a relation. A "causal" relation means a relation between two variables in which when a value of one variable is changed, a value of the other variable also changes. For example, a relation between a lighting switch and room brightness is in such a relation.

Here, in order to recognize a correlation relation as a causal relation, it is considered that requirements, such as "strength of the correlation (Strength)", "probability of the correlation (Consistency)", "specificity of the correlation (Specificity)", "establishment of a relation between quantity and reaction (Biological Gradient)", "temporal precedence (Temporality)", "relevance (Plausibility)", "consistency with prior knowledge (Coherence)", "consistency with other knowledge (Analogy)", and "coincidence with experiment (Experiment)", have to be satisfied (Hill's guidelines and the like).

Various methods have been studied for controlling a desired result in a manufacturing process or an inspection process using a correlation relation between various measurement values analyzed by an information processing system. For example, according to big data analysis and the like, it has become possible to analyze a correlation relation between rough variables (obtained values of a sensor and the like). Meanwhile, in correlation relations, although there are relations including a causal relation, there are also relations that are different from the causal relation, so even if it is attempted to apply an analyzed correlation relation to efficiency improvement of a specific manufacturing site, it is difficult to contribute to control of a result thereof unless a quantitative causal relation can be specified.

If a causal relation can be efficiently extracted from a correlation relation between multiple measurement items, it becomes easy to specify a quantitative causal relation. In addition, it is considered that efficiency of deployment to other events can be increased by accumulating such a causal relation as knowledge. In addition, when being applied to the manufacturing process and the inspection process, it can be said that the above-described "relevance (Plausibility)" means to coincide with a physical model (not violate physical law). Therefore, determining whether or not the extracted correlation model coincides with the physical model has a similar meaning as determining whether or not the correlation relation is a causal relation.

FIG. 1 shows a configuration example of a knowledge management apparatus according to a first embodiment of the invention. A knowledge management apparatus 100 includes a storage unit 110 and a control unit 120. The storage unit 110 includes a manufacturing result storage unit 111, an inspection result storage unit 112, and a causal inference model storage unit 113. The control unit 120 includes a result value reception unit 121, a correlation model construction unit 122, a probability distribution computation unit 123, a physical model reception unit 124, a probability distribution convergence processing unit 125, an update determination unit 126, and a causal inference model holding unit 127.

FIG. 2 shows an example of a data structure of a manufacturing result storage unit. The manufacturing result storage unit 111 contains pVar1 (111*a*) pVar2 (111*b*), pVar3 (111*c*), pVar4 (111*d*), pVar5 (111*e*), pVar6 (111*f*), pVar7 (111*g*), pVar8 (111*h*), pVar9 (111*j*), and pVar10 (111*k*).

The manufacturing result storage unit 111 contains manufacturing data obtained by monitoring an operating state of a manufacturing device, and individual items of the manufacturing data are indicated by item names pVar1 to pVar10. For example, the pVar1 (111*a*) are item names indicating ID numbers to identify individual products. The pVar2 (111*b*) to pVar10 (111*k*) in second and subsequent columns are data obtained as results of monitoring the operating state of the manufacturing device with a sensor and the like. Examples of items to monitor the operating state include temperature, humidity, pressure, current, voltage, amount of substance, and the like during processing.

In general, these data are obtained by periodic sampling at time of manufacturing the product. Here, the periodic sampling refers to periodically acquiring sensor data at a predetermined frequency in accordance with various types of monitoring items, such as a frequency of 100 times per second.

In general, manufacturing and processing time of the product is longer than a sampling interval of the periodic sampling. Therefore, while one product is being processed, data acquired from the same sensor is acquired for a plurality of times. Therefore, when ID numbers to identify individual products are arranged in a first column as shown in FIG. 2, duplication occurs in data having the same ID number since sampling data are obtained for a plurality of times.

Therefore, ID numbers to identify individual products are treated as unique keys to uniquely specify each row vector, and data are formatted so that duplication does not occur in the ID numbers to identify individual products by using statistical values (average value, median value, and the like) of the data acquired a plurality of times for each item.

As another example of monitoring the operating state, there is a processing time required for the processing of the product. For such data, each time one product is processed, data atone point (processing time) is obtained. Therefore, in such data, the data can be directly used without performing a statistical processing since duplication does not occur in the ID numbers to identify individual products.

FIG. 3 shows an example of a data structure of an inspection result storage unit. The inspection result storage unit 112 contains cVar1 (112*a*), cVar2 (112*b*), cVar3 (112*c*), cVar4 (112*d*), cVar5 (112*e*), cVar6 (112*f*), cVar7 (112*g*), cVar8 (112*h*), cVar9 (112*j*), and cVar10 (112*k*).

The inspection result storage unit 112 contains inspection data which are measurement results of an inspection device, and individual items of the inspection data are indicated by item names of the cVar1 to the cVar10. For example, the cVar1 (112*a*) are item names indicating ID numbers to identify individual products. These data are in correspondence with the pVar1 (111*a*) of the manufacturing result storage unit 111 and the same individual is indicated by the same value. Therefore, by referring to these data, it is possible to acquire a correspondence relation between the manufacturing data obtained by monitoring the operating state of the manufacturing device and the inspection data.

The cVar2 (112*b*) to the cVar10 (112*k*) in second and subsequent columns are data obtained as results of measuring the inspection device with a sensor and the like. Examples of the inspection data include a measurement value related to a physical size such as a size of a specific portion of a product, a measurement value related to an electrical characteristic, and the like.

Such inspection data are measured as numerical values. A standard range is set for the inspection data, and it is determined that whether or not product data is within the standard range. The above-mentioned cVar10 (112*k*) are data representing determination results of whether or not the product inspection data is within the standard range. In this example, when the product inspection data is within the standard range, "OK" is stored; if not, "NG" is stored.

Determination according to such a standard range is performed for each measurement value, and there is a case where all determination results for every measurement value are recorded and a case where a comprehensive determination result for all measurement values is recorded. In an example of FIG. 3, only one determination result is mentioned, which means that the comprehensive determination result is recorded.

The result value reception unit 121 reads manufacturing log data including either or both of the manufacturing data obtained by monitoring the operating state of the manufacturing device and the inspection data. Specifically, the result value reception unit 121 reads data from the manufacturing result storage unit 111 of the storage unit 110 and the inspection result storage unit 112.

The correlation model construction unit 122 constructs a correlation model by using the manufacturing log data. Specifically, the correlation model construction unit 122 constructs a Bayesian network by associating correlated items with causes and results using a structure learning algorithm such as a K2 algorithm regardless of whether or not the correlated items are strictly in a causal relation, and stores correlated items by extension data of a generally used extensible markup language (XML), and the like. When it is rendered as graphical data, a directed model having edges and nodes as shown in FIG. 5 is obtained.

FIG. 5 shows an example of a causal inference model. The causal inference model is a graphical model which shows relations between causes and results with vertices, that is, nodes, and arrows, that is, edges. In general, the correlation model in the present embodiment is called a causal inference model. However, since the expression “causal inference model” does not require a strict causal condition, it can be said to be a model in which a correlation relation is accurately inferred. In the present embodiment, a correlation relation that does not require the causal condition is expressed as a correlation model, and in a case where approximation to the physical model is one requirement, it is expressed as a causal inference model in order to distinguish it from the correlation model.

In FIG. 5, an arrow, that is, an edge, extends from the pVar1 (401) to the cVar2 (402). This indicates that there is a causal relation between the pVar1 (401) and the cVar2 (402). Further, the pVar1 (401) side is a root of the arrow and the cVar2 (402) side is a tip of the arrow. This indicates that the pVar1 (401) is a cause and the cVar2 (402) is a result.

In addition, in the causal inference model, there is a decomposition formula of a probability distribution corresponding to a graphical model formed of nodes and edges as shown in FIG. 5. FIG. 6 shows an example of the formula.

FIG. 6 shows an example of a causal relation. FIG. 6 shows an example of a causal relation formed of a variable x1 (501), a variable x2 (502), a variable x3 (503), and a variable x4 (504). This means that a left side of the decomposition formula of the probability distribution, that is, a decomposed side expression, is a simultaneous probability distribution p (x1, x2, x3, x4) of the variable x1 (501), the variable x2 (502), the variable x3 (503), and the variable x4 (504). In FIG. 6, an arrow, that is, an edge, extends from the variable x1 (501) to the variable x2 (502). This means that a conditional probability p (x2|x1) is included in a right side of the decomposition formula of the probability distribution. In the following examples, the conditional probability is included in the right side of the decomposition formula in a form corresponding to the arrow.

The probability distribution computation unit 123 specifies a probability distribution of the correlation model and the physical model. When the correlation model is already obtained as a probability distribution by the correlation model construction unit 122, the probability distribution computation unit 123 does not perform any specific processing. With respect to the physical model, the probability distribution computation unit 123 generates an array according to dimensions of items of the physical model and relationships therebetween, and calculates a probability of elements of the array. Formula (1) is an example of the physical model.

<Formula 1>

$$y=f(x1,x2)=a_1\cdot x1+a_2\cdot x2+\varepsilon \tag{1}$$

Formula (1) is an example of modeling a relation between an objective variable “y” and explanatory variables “x1” and “x2” by a linear relationship. Generally, in a case of modeling by such a linear relationship, “ε” is arranged as an error term. The error term “ε” is used as a probability distribution with an average of “0”. For example, in the least squares method, a normal distribution is used. Therefore, when an array of probability distributions is generated using a physical model of the linear relationship constructed by using the least squares method, a multidimensional normal distribution having a linear formula at an average value is used. More generally, when the probability distribution of the error term is not determined, the probability distribution can be obtained by setting the probability in the physical model formula to “1” and the others to “0”, even in cases other than the linear relationship.

The physical model reception unit 124 receives an input of the physical model obtained by modeling a physical law related to the manufacturing process or the inspection process. As an example of the physical model, there is a relationship defined by a mathematical formula such as Arrhenius’s law or Ohm’s law. As a method of defining mathematical formulas, it is possible to define arbitrary mathematical formulas by using a format defined by general LaTeX (RA-TECH, REI-TECH) and the like. In particular, although it is desirable that the physical model reception unit 124 receives the physical model described in a form of an implicit function (the value of one variable of arguments is related to remaining variables), the physical model is not limited thereto, and may be a physical model described by an explicit function.

The probability distribution convergence processing unit 125 performs convergence computation on the probability distribution of the correlation model and approximates the result of the convergence computation to the probability distribution of the physical model. Specifically, the probability distribution convergence processing unit 125 randomly selects one combination of the objective variable “y” and a value of the explanatory variable “x1”, and a value of the explanatory variable “x2” in the objective variable “y”, as a point respectively. When the causal inference model includes a conditional probability (for example, p (x1|y), p (x2|y) and the like), the probability distribution convergence processing unit 125 randomly selects one point according to conditional probabilities (random sampling) for each combination of “x1” and “y” and “x2” and “y”.

The probability distribution convergence processing unit 125 specifies a probability of the selected point for each combination and randomly perturbs the probability. The probability distribution convergence processing unit 125 causes the update determination unit 126 to determine a necessity of updating, and causes the causal inference model after the perturbation to be overwritten and stored in the causal inference model holding unit 127 when the updating is necessary. The probability distribution convergence processing unit 125 performs such processing for a plurality of times (for example, 10,000 times), and converges the probability distribution of the correlation model so as to approach the physical model.

As a method of the perturbation, the probability distribution convergence processing unit 125 changes probabilities of the randomly sampled point as formula (2) and formula (3) ((x1, y) in the formula (2) and (x2, y) in the formula (3)).

⟨Formula 2⟩

$$\frac{p(x1 \mid y) + \delta}{\int (p(x1 \mid y) + \delta) dx1} \tag{2}$$

⟨Formula 3⟩

$$\frac{p(x2 \mid y) + \delta}{\int (p(x2 \mid y) + \delta) dx2} \tag{3}$$

That is, in the above formula (2), the p (x1 Y) of the numerator is a probability distribution before the perturbation. In the above formula (2), the perturbation is performed by adding a variation value δ (delta) to the probability distribution before the perturbation. At this time, the variation value "δ" is a randomly obtained value. However, a normal distribution or a uniform distribution is used in a probability distribution of the random variation value "δ".

The denominator of the formula (2) is scalar multiple for normalization, and is a correction factor for a fact that the total probability is not "1" by adding the variation value "δ" in the numerator. Similarly, the above formula (3) is an example of a formula to perturb p (x2|y). In this way, the probability distribution convergence processing unit 125 perturbs the probability of the selected point.

The update determination unit 126 determines whether or not to adopt the probability distribution updated by the perturbation. Specifically, the update determination unit 126 determines whether or not the probability distribution updated by the perturbation approaches the probability distribution obtained from the physical model using a pseudo distance, such as the Kullback-Leibler Divergence or the L2 distance (L2 norm), capable of determining approximation between probability distributions, and determines that the probability distribution updated by the perturbation is adopted when the approaching is determined. However, the invention is not limited thereto, and for example, the update determination unit 126 may adopt the probability distribution updated by the perturbation even when the probability distribution updated by the Perturbation moves away from the probability distribution obtained from the physical model in a certain degree.

The causal inference model holding unit 127 stores the correlation model of the result of the probability distribution convergence processing in the causal inference model storage unit 113. Specifically, the causal inference model holding unit 127 stores the causal inference model in a format called JavaScript Object Notation (JSON).

For example, the causal inference model holding unit 127 stores data in the JSON format shown in FIG. 10 for each vertex, that is, node of the correlation model.

FIG. 10 shows an example of a data structure using JSON of the causal inference model. "Frame" element indicates a class value at a time of discretizing the data in order to store the probability distribution. In the example of FIG. 10, it is indicated that "−0.01 to 0.01" belongs to class "1" and "0.01 to 0.03" belongs to class "2".

"UniqueName" element indicates an ID for a computer to uniquely recognize a variable. In this example, the character string "Class" is held as an ID to uniquely recognize the variable.

"Parents" element indicates a variable which is a cause. In the example of FIG. 10, [ ] means an empty set. This indicates that there is no variable which is a cause in the node.

"Prob" element indicates a conditional probability. In the example of FIG. 10, "0.51" and "0.49" are held. This indicates that, when a target variable is taken from the class "1" whose value range is "−0.01 to 0.01", the probability is "0.51"; when a target variable is taken from the class "2" whose value range is "0.01 to 0.03", the probability is "0.49".

"Qty" element holds the number of data points used to calculate the conditional probability. In the example of FIG. 10, "4297" and "4271" are held. This indicates that, when a target variable is taken from the class "1" whose value range is "−0.01 to 0.01", the number of data is "4297"; when a target variable is taken from the class "2" whose value range is "0.01 to 0.03", the number of data is "4271".

"Label" element holds a display name of the variable specified by "UniqueName" element. In the example of FIG. 10, a character string "Yield" is held.

"ParentsFrame" element holds a class value used at the time of discretizing the variable which is a cause. In the example of FIG. 10, [ ] means an empty set since there is no variable which is a cause as shown in "Parents" element.

FIG. 4 shows an example of a hardware configuration of a knowledge management apparatus. The knowledge management apparatus 100 can achieve its functions through a computer including a central processing unit (CPU) 101, a memory 102, an external storage device 103 such as a hard disk drive (HDD), an input device 104 such as a keyboard, a mouse, and a barcode reader, and an output device 105 such as a display, or through a computer system including a plurality of such computers.

For example, the result value reception unit 121, the correlation model construction unit 122, the probability distribution computation unit 123, the physical model reception unit 124, the probability distribution convergence processing unit 125, the update determination unit 126, and the causal inference model holding unit 127 of the control unit 120 can achieve their functions through loading a predetermined program stored in the external storage device 103 into the memory 102 and executing the program by the CPU 101, and the storage unit 110 can achieve its functions through utilizing the memory 102 or the external storage device 103 by the CPU 101.

However, the invention is not limited thereto, and the knowledge management apparatus 100 may achieve its functions through, for example, an application specific integrated circuit (ASIC) or a microcomputer.

FIG. 7 shows an example of a flow of a knowledge generation processing. The knowledge generation processing is started according to an instruction from an operator.

First, the result value reception unit 121 reads the manufacturing log data (step S001). Specifically, the result value reception unit 121 reads the manufacturing log data including either or both of manufacturing data obtained by monitoring the operating state of the manufacturing device and the inspection data of the product. For example, the result value reception unit 121 reads either or both of the manufacturing data and the inspection data stored in the manufacturing result storage unit 111 and the inspection result storage unit 112.

The correlation model construction unit 122 constructs a correlation model (step S002). Specifically, the correlation model construction unit 122 associates correlated items with the cause and the result using the structure learning algorithm such as the K2 algorithm and the like, and stores the correlated items by extension data of the generally used XML and the like.

The physical model reception unit 124 reads the physical model (step S003). Specifically, by an input of the operator, the physical model reception unit 124 receives an input of a physical model obtained by modeling a physical law related to the manufacturing process or the inspection process. An example of the physical model is a mathematical formula related to general natural laws such as electricity and physics including Arrhenius's law or Ohm's law.

The probability distribution convergence processing unit 125 performs a convergence computation processing of the probability distribution (step S004). Specifically, the probability distribution convergence processing unit 125 performs convergence computation processing of the probability distribution as shown in FIG. 8. The convergence computation processing of the probability distribution as shown in FIG. 8 will be described in detail below.

The causal inference model holding unit 127 stores the causal inference model (step S005). Specifically, the causal inference model holding unit 127 stores the correlation model of the result of the probability distribution convergence processing in the causal inference model storage unit 113 in the format called a predetermined JSON.

The above is a flow of the knowledge generation processing. According to the knowledge generation processing, a causal inference model with a high probability can be constructed by using data related to the manufacturing or the inspection and the physical model.

FIG. 8 shows an example of a flow of a convergence computation processing of the probability distribution. The convergence computation processing of the probability distribution is started at step S004 of the knowledge generation processing.

First, the probability distribution computation unit 123 converts the physical model into a probability model (step S0041). Specifically, with respect to the physical model, the probability distribution computation unit 123 generates an array according to a dimension of items of the physical model and a relationship therebetween, and calculates a probability for each element of the array.

The probability distribution convergence processing unit 125 randomly samples the objective variable "y" (step S0042), and randomly samples the explanatory variable "x" (step S0043). Specifically, the probability distribution convergence processing unit 125 randomly selects one combination of the objective variable and the value of the explanatory variable as a point. This is for a purpose of randomly determining a possible probability by randomly selecting a point according to a condition of all combinations of the objective variable and the explanatory variables.

FIG. 9 shows an example of a random sampling processing. FIG. 9 is an example of a case where the physical model is taken into a linear relationship represented by formula (1). In formula (1), the objective variable is represented by "y". In FIG. 9, horizontal axes 612 and 622 represent the objective variable (y), and vertical axes 611 and 621 represent the explanatory variable (x1 or x2). In the example of formula (1), there are two explanatory variables of "x1" and "x2". Accordingly, a distribution diagram 610 on the left shows a probability distribution of the objective variable "y" and the explanatory variable "x1", and a distribution diagram 620 on the right shows a probability distribution of the objective variable "y" and the explanatory variable "x2". In the distribution diagram 610 and the distribution diagram 620 of FIG. 9, a portion with a light color has a high probability value, and a portion with a dark color has a low probability value.

In FIG. 9, randomly sampling an objective variable corresponds to selecting one point from the horizontal axes 612 and 622. In FIG. 9, outlined white circles 613 and 623 drawn on the horizontal axes indicate values of sampled "y" (between the distribution diagrams, the values of "y" are equivalent).

Further, in FIG. 9, randomly sampling an explanatory variable corresponds to selecting one point from the vertical axes 611 and 621. In FIG. 9, color filled circles 614 and 624 respectively correspond to the sampled values.

The probability distribution convergence processing unit 125 perturbs the probability distribution by an error value (variation value) "δ" (step S0044). Specifically, the probability distribution convergence processing unit 125 changes probabilities of the points randomly sampled as the above formula (2) and (3). In the perturbation processing, the error value "δ" according to the random sampling having a predetermined distribution may be used as a perturbation amount that gradually converges to a small value in accordance with the number of times of repetitive processing or the variation amount of a pseudo distance described below due to the previous perturbation. In this way, it is easier to converge the probability distribution with a higher accuracy.

The update determination unit 126 determines whether or not to adopt the probability distribution updated by the perturbation. Specifically, the update determination unit 126 determines whether or not the probability distribution updated by the perturbation approaches the probability distribution obtained from the physical model using a pseudo distance, such as the Kullback-Leibler Divergence or the L2 distance (L2 norm), capable of determining approximation between the probability distributions, and determines that the probability distribution updated by the perturbation is adopted when the approaching is determined. As described above, it is also possible to adopt the probability distribution updated by the perturbation even when the probability distribution updated by the perturbation approach but moves away from the probability distribution obtained from the physical model in a certain degree.

When the updated probability distribution is adopted, the probability distribution convergence processing unit 125 performs an update processing (step S0045). Specifically, when the updated probability distribution is adopted, the probability distribution is overwritten, and if not adopted, the probability distribution updated by the perturbation is discarded.

Then, the probability distribution convergence processing unit 125 determines to terminate the processing (step S0046). Specifically, the probability distribution convergence processing unit 125 determines that the convergence is achieved and terminates the convergence computation processing of the probability distribution when the approaching amount of the probability distribution updated by the perturbation to the probability distribution obtained from the physical model is smaller than a predetermined threshold, that is, when the variation amount of the pseudo distance such as Kullback-Leibler Divergence or the L2 distance (L2 norm) is smaller than a predetermined threshold value. If the variation amount is equal to or greater than the predetermined threshold, the probability distribution convergence processing unit 125 returns the control to step S0042 in order to continue the processing.

The above is the flow of the convergence computation processing of the probability distribution. According to the convergence computation processing of the probability distribution, a causal inference model incorporating a physical model can be constructed. In other words, since the probability distribution of the correlation model can be gradually approximated to the probability distribution of the physical model by repeating the process of randomly perturbing the probability distribution of the correlation model, the causal inference model can be extracted.

FIG. 11 shows an example of an output screen of the knowledge generation processing. An example 900 of the output screen of the knowledge generation processing includes a causal inference model confirmation window 901, a physical model definition window 903, a Build button 904, and a Re-Build button 905.

The correlation model constructed by the correlation model construction unit 122 is displayed in the causal inference model confirmation window 901 in a form of a graphical model.

Further, in the causal inference model confirmation window 901, a Cut menu 902 appears when a right click on an edge is received. When a click on the Cut menu 902 is received, an unnecessary edge is cut, and relation information is also deleted from the correlation model.

The physical model definition window 903 receives an input of a mathematical formula of the physical model. Specifically, the physical model definition window 903 receives an input of a mathematical formula with a format defined by LaTeX (including a derivative that can be expressed by a mathematical formula according to a region through a used natural language and the like) and the like. In the example of FIG. 11, a formula "y=f (x_1, x_2)" in the LaTeX format corresponding to "y=f (x1, x2)" is an example of the input. The physical model definition window 903 is not limited to this, a skeleton of a predetermined formula may be selected and input, and an edit input to the skeleton may be received.

When the Build button 904 receives an input, the correlation model construction processing of step S002 of the knowledge generation processing is performed.

The Re-Build button 905 constructs a causal inference model reflecting the physical model input to the physical model definition window 903 in the correlation model edited in the causal inference model confirmation window 901. That is to say, the knowledge generation processing is started from reading the physical model in step S003. The above is the example 900 of the output screen of the knowledge generation processing.

The above is an embodiment according to the invention. According to the above embodiment, knowledge can be easily extracted in a manufacturing site by modeling knowledge of a physical model and the like that has been confirmed to be tenable into a form that can be mutually used in other manufacturing sites.

The invention is not limited to the embodiment described above, and includes various modifications. For example, the embodiment described above is detailed for easy understanding but the invention is not necessarily limited to including all the above configurations.

A part of the configuration of the embodiment may be omitted or be combined or replaced with another configuration.

In regard to each of the above configurations, functions, processing units, and the like, a part thereof or an entirety thereof may be achieved by hardware, for example, by being designed as an integrated circuit. Further, each of the above configurations, functions, and the like may be achieved by software control that executes an operation in accordance with a program that achieves each function by a processor. Information such as the programs, tables, files, and the like for achieving the functions can be stored in a storage device such as a memory, a hard disk, an SSD or a storage medium such as an IC card, an SD card, a DVD, and the like, and can be read from RAM (Random Access Memory) at a time of being executed by a CPU and the like.

Only control lines and information lines that are considered necessary for description are illustrated, and not all the control lines and information lines required for production are necessarily illustrated. It may be contemplated that in practice, almost all of the configurations are mutually connected.

In regard to each of the above configurations, functions, processing units, and the like, a part thereof or an entirety thereof may be achieved by a distributed system by being executed by another device and by performing an integration processing via a network or the like.

Technical elements of the embodiment may be applied alone, or may be applied by being divided into a plurality of portions such as program parts and hardware parts.

The invention has been described mainly through the embodiment.

REFERENCE SIGN LIST

100 . . . knowledge management apparatus, 110 . . . storage unit, 111 . . . manufacturing result storage unit, 112 . . . inspection result storage unit, 113 . . . causal inference model storage unit, 120 . . . control unit, 121 . . . result value reception unit, 122 . . . correlation model construction unit, 123 . . . probability distribution computation unit, 124 . . . physical model reception unit, 125 . . . probability distribution convergence processing unit, 126 . . . update determination unit, 127 . . . causal inference model holding unit.

The invention claimed is:

1. A causal inference model construction method for improving efficiency of obtaining causal relations from correlation relations and improving control of a manufacturing process, using a computer, wherein the computer comprises a control unit and a storage unit, and the control unit implements:

a result value reception step of reading, from the storage unit, manufacturing log data including sensor data acquired in either or both of the manufacturing process and an inspection process;

a correlation model construction step of constructing a correlation model using the manufacturing log data and storing the correlation model in the storage unit;

a physical model reception step of receiving an input of a physical model obtained by modeling a physical law related to the manufacturing process or the inspection process;

a probability distribution computation step of calculating a probability distribution of the correlation model and a probability distribution of the physical model;

randomly selecting, from the physical model, a combination of two variables;

changing the probability distribution of the combination of the two variables by an error value to create a new probability distribution;

a probability distribution convergence processing step of determining to adopt the new probability distribution on a condition that a result of a convergence computation on the probability distribution of the correlation model approximates a result of the convergence computation to the distribution of the physical model;

deleting the new probability distribution on a condition that the result of a convergence computation on the probability distribution of the correlation model does not approximate the result of the convergence computation to the probability distribution of the physical model; and a causal inference model holding step of storing an updated correlation model which is a processing result of the probability distribution convergence processing step in the storage unit as a causal inference model.

2. The causal inference model construction method according to claim 1, wherein in the correlation model construction step, a Bayesian network is used.

3. The causal inference model construction method according to claim 1, wherein in the physical model reception step, a physical model described in a form of an implicit function is received.

4. The causal inference model construction method according to claim 1, wherein in the probability distribution convergence processing step, perturbation processing is performed on the probability distribution of the correlation model, and approximation is determined according to a norm between a probability distribution after the perturbation processing and the probability distribution of the physical model.

5. The causal inference model construction method according to claim 1, wherein in the probability distribution convergence processing step, perturbation processing is performed on the probability distribution of the correlation model, during which the error value according to a random sampling having a predetermined distribution is used as a perturbation amount, and approximation is determined according to a norm between a probability distribution after the perturbation processing and the probability distribution of the physical model.

6. The causal inference model construction method according to claim 1, wherein in the probability distribution convergence processing step, perturbation processing is repeatedly performed on the probability distribution of the correlation model, in which the error value according to a random sampling having a predetermined distribution is used as a perturbation amount that gradually converges to a small value, and approximation is determined according to a norm between a probability distribution after the perturbation processing and the probability distribution of the physical model.

7. The causal inference model construction method according to claim 1, wherein in the probability distribution convergence processing step, perturbation processing is repeatedly performed on the probability distribution of the correlation model, in which the error value according to a random sampling having a predetermined distribution is used as a perturbation amount that gradually converges to a small value, and a probability distribution before the perturbation processing is overwritten by a probability distribution after the perturbation processing when a norm between the probability distribution after the perturbation processing and the probability distribution of the physical model is smaller than a norm between the probability distribution before the perturbation processing and the probability distribution of the physical model.

8. The causal inference model construction method according to claim 1, wherein in the causal inference model storage step, a JavaScript Object Notation (JSON) format is used for storage.

* * * * *